United States Patent [19]

Fischer

[11] Patent Number: 4,804,209

[45] Date of Patent: Feb. 14, 1989

[54] PLUMMER'S UNION

[76] Inventor: Kevin H. Fischer, 180 Valley Ridge Dr., Paradise, Calif. 95969

[21] Appl. No.: 110,519

[22] Filed: Oct. 20, 1987

[51] Int. Cl.$^4$ .............................................. F16L 13/10
[52] U.S. Cl. ..................................... 285/31; 285/297; 285/423; 285/915
[58] Field of Search .............. 285/297, 294, 31, 915, 285/423

[56] References Cited

U.S. PATENT DOCUMENTS

| 3,971,574 | 7/1976 | Curtin | 285/31 |
| 4,386,796 | 6/1983 | Lyall et al. | 285/31 |
| 4,521,037 | 6/1985 | Knox | 285/31 X |
| 4,687,232 | 8/1987 | Zimmerman | 285/31 |
| 4,690,434 | 9/1987 | Schmidt | 285/31 |

FOREIGN PATENT DOCUMENTS

| 872705 | 4/1953 | Fed. Rep. of Germany | 285/297 |
| 521458 | 9/1957 | Italy | 285/294 |

Primary Examiner—Thomas F. Callaghan

[57] ABSTRACT

An adjustable telescoping union for repairing or connecting two ends of PVC pipe which cannot be manipulated lengthwise is provided in a two piece telescoping coupler. An internally lipped tubular housing having a retained sleeve sized to standard PVC pipe can be adjusted laterally to join two ends of the pipe and has gluing means for a permanent and leak-proof rejoining of the two separated pipe ends.

6 Claims, 1 Drawing Sheet

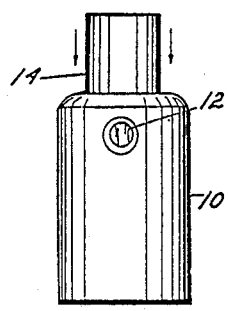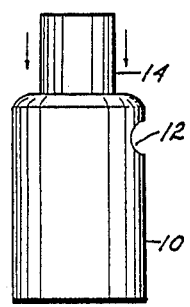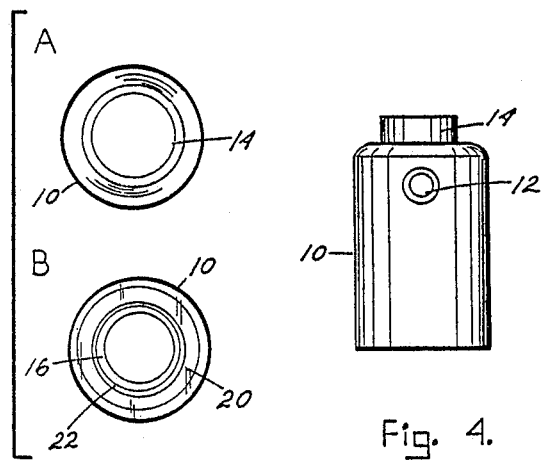

PLUMMER'S UNION

BACKGROUND OF THE INVENTION

1. Field of the invention

This invention relates to connectors for PVC pipe. The present invention is particularly directed towards quick, easy and permanent connections between two pieces of PVC pipe within a narrow or confined space.

2. Description of the Prior Art

Past art patents which were considered most pertinent to my invention were found in the following classes and subclasses:

285/177, 297, 294 and 915.

These patents are as follows:

1. U.S. Pat. No. 2,460,668 issued to P. D. Wurzburger on Feb. 1, 1949, discloses a metal telescoping capillary fitting bondable with solder.

2. On July 31, 1951, U.S. Pat. No. 2,562,294 was issued to M. T. Cahenzli Jr. and depicts a metal coupler utilizing threadable connections.

3. Allen H. Willinger was issued U.S. Pat. No. 3,584,901 on June 15, 1971, on a plastic tubing connection utilized in aquarium apparatus.

4. U.S. Pat. No. 3,602,531 issued to Leon R. Patry on Aug. 31, 1971, discloses a conically shaped tubing coupler.

5. Virgil Phillipps was issued U.S. Pat. No. 3,690,703 on Sept. 12, 1972, illustrates a coupling device for connecting hoses of different diameters.

6. On Nov. 12, 1974, Albert Stewing was issued U.S. Pat. No. 3,847,694 which shows a method of joining PVC tubes with a thermoplastic adhesive.

7. U.S. Pat. No. 3,920,787 was issued to Jon J. McDowell et al on Nov. 18, 1975, illustrates a joining device utilizing a tapered inner reduced portion to compensate for differences in diameter sizes of joining tubes.

8. A patent issued to Anthony J. Foresta et al, dated Nov. 6, 1984, U.S. Pat. No. 4,480,860 shows a pipe union assembly using a clamping type joint.

To my knowledge the preceding patents represented the past art designs most pertinent to my invention. None of the preceding patents appeared to depict couplers which can be utilized without having one or both ends of the connecting pipe be moveable. These past art couplers would therefore prove difficult if not impossible to use on pipe that has already been installed underground, and from which a small section is either missing or must be removed. My invention is designed to accommodate such a circumstance by being adjustable and applicable to confined spaces.

SUMMARY OF THE INVENTION

A primary objective of my invention is to provide an adjustable union for uniting two ends of PVC pipe which are fixed in position and cannot be manipulated lengthwise.

Another objective of the present invention is ease in application even when the available space is severely limited.

A further objective of my invention is to provide a permanent connection between two ends of PVC pipe through an adherent material sealing arrangement.

Other objectives and many other advantages of my invention will prove evident with a reading of the specification and a comparison of the numbered parts of the drawings.

A BRIEF DESCRIPTION OF THE DRAWINGS

In the drawings:

FIG. 1. shows the present invention in a frontal view.

FIG. 2. shows the invention in a side view.

FIG. 3. shows "A"; a top view of the invention and "B"; a bottom view.

FIG. 4. is a frontal view of the invention with the inner telescoping sleeve retracted and in position for gluing.

FIG. 5. represents the invention in frontal and rear perspective in the sealed position.

FIG. 6. represents the invention in frontal and rear perspective in the unsealed position.

FIG. 7. depicts the device in an exploded view showing the relative placement of the parts in relation to one another.

FIG. 8. shows a cross section of the invention in the gluing before attachment is made.

FIG. 9 shows a cross section of the invention after the glue has been applied and the two ends of the PVC pipe have been connected.

FIG. 10. shows the invention in use connecting two ends of PVC pipe.

DESCRIPTION OF THE PREFERRED EMBODIMENT

Figure 5:
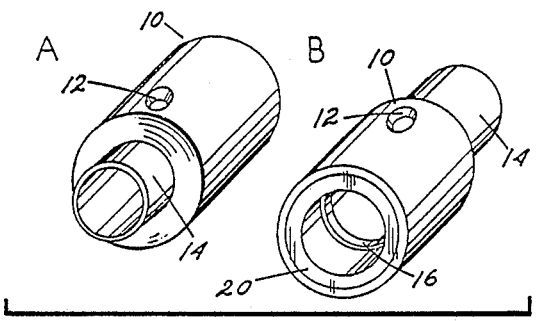
Figure 6:
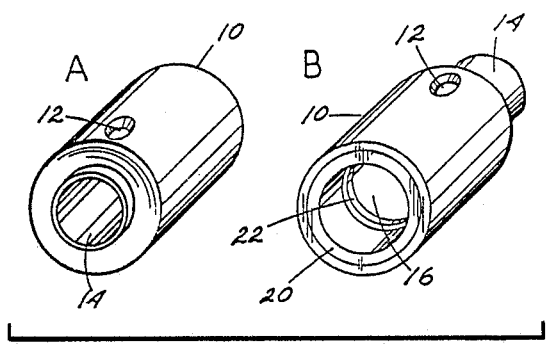
Figure 7:
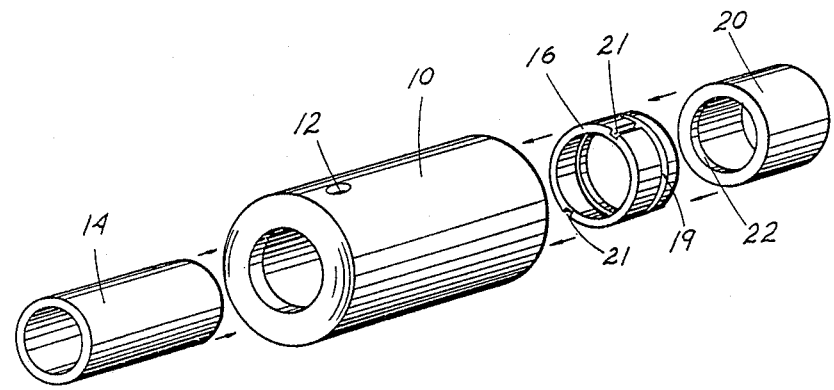

Referring now to the drawings and the numbered parts thereon. Housing 10 comprises the main body of the invention with gluing hole 12 situated towards the upper portion of the housing. Inner telescoping sleeve 14 slides inside housing 10 and is permanently attached to interior lip ring 16. Interior lip ring 16 moves freely inside housing 10. Gluing groove 19 is adjacent the lip surface on lip ring 16 and circumvents the outer surface and longitudinal glue inlet grooves 21 transverse said ring in two adjacent sights, to the left of gluing groove 19 as illustrated in FIG. 7.

Slip reducing bushing 20 is interiorly attached to housing 10 and pipe stop lip 22 is inherently designed into slip reducing bushing 20. Right pipe 24 is to be attached to the inside of slip reducing bushing 20 after which glue 26 is injected from glue nozzle 28 into glue hole 12 which will be disbursed around interior telescoping sleeve 14 through glue inlet grooves 21 to gluing groove 19 by pulling interior telescoping sleeve 14 to the left and attaching to left pipe 30.

Figure 8:
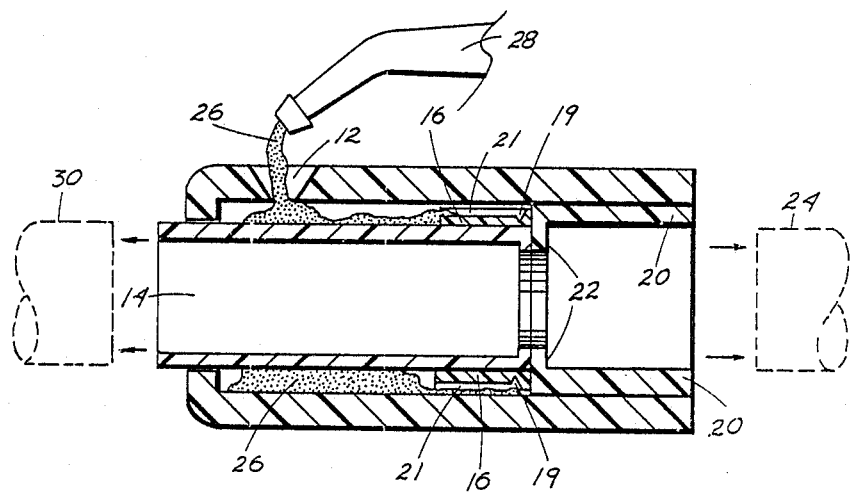
Figure 9:
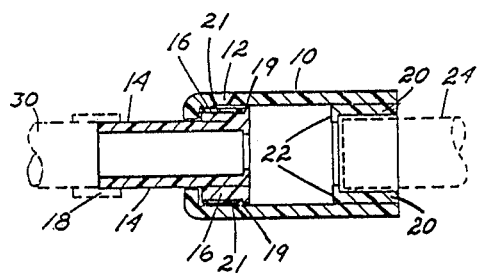
Figure 10:
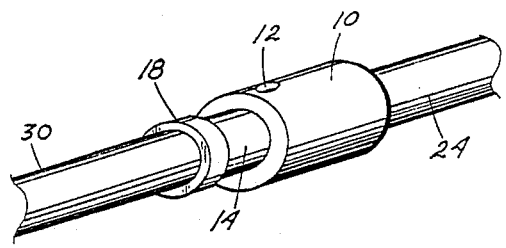

In using the invention, the housing 10 with all parts assembled is situated between two ends of pipe 24 and 30 as seen in FIG. 8. Slip reducing bushing 20, which is permanently attached to housing 10, is fitted over right pipe 24 and attached by conventional methods. Glue 26 is introduced into glue hole 12 which flows around interior telescoping sleeve 14 and is forced into glue inlet grooves 21 to gluing groove 19 when interior telescoping sleeve 14 is pulled out and attached by conventional means with external coupler 18 to left pipe 30 as seen in FIG. 9. Glue 26 is forced into groove 21 then into gluing groove 19 which thereby helps prevent a leakage between inner lip ring 16 and gluing hole 12 by having the placement of said gluing groove behind or to the right of said glue hole when interior telescoping ring 14 is in the final attached position as seen in FIG. 9 and FIG. 10.

Although I have described in detail the preferred embodiment of my invention in the specification, is to be understood that modifications to my invention may be made in design and structure which do not exceed the intended scope of the appended claims.

What I claim is:

1. An adjustable union coupler for repairing and connecting PVC pipe ends comprising:
    an elongated substantially tubular housing having longitudinal passageway therethrough for a tubular interior telescoping sleeve movably fitted therein;
    said tubular housing internally lipped at one end thereof and fixable internally at the opposite end with a slip-reducing bushing;
    said tubular telescoping sleeve affixed on the outer surface at one end with a restricting lip ring;
    said restricting lip ring having a gluing groove circumvolved outwardly edgewise on the surface thereof and two longitudinal glue inlet groves on opposite sides in said outer surface of said lip ring commencing at said circumvolved gluing groove as inward lateral extensions thereof;
    said tubular telescoping sleeve and said slip-reducing bushing both affixed with a pipe stop lip at adjacent interior positions;
    said tubular housing apertured at said lipped end thereof for glue application therethrough onto said interior telescoping sleeve for glue attachment of said housing lip to said restricting lip ring and extrusion through said glue inlet grooves to said circumvolved gluing groove for permanent attachment of said interior lip ring to the internal surface of said housing;
    said adjustable union coupler, the assemblage thereof, attachable at said slip-reducing bushing end to one end of a PVC pipe by adhesive means, and at said tubular telescoping sleeve end to one end of a second PVC pipe by longitudinal telescoping of said telescoping sleeve from said tubular housing and attachment thereof to said second end of PVC pipe with an external coupler by adhesive means.

2. The adjustable union coupler of claim 1 wherein said tubular housing internally lipped is structured with said internal lip being a plastic ring glued into said housing.

3. The adjustable union coupler of claim 1 wherein said tubular housing internally lipped is manufactured with said internal lip being a part thereof.

4. The adjustable union coupler of claim 1 wherein said slip-reducing bushing is structured with said bushing being a plastic ring glued into said housing after assemblage and installation of interior telescoping sleeve.

5. The adjustable union coupler of claim 1 wherein said slip-reducing bushing is manufactured into said housing and said lip is a plastic ring glued into said housing after assemblage and installation of interior telescoping sleeve.

6. The adjustable union coupler of claim 1 wherein said tubular housing aperatured at said lipped end thereof having said aperture being a hole through said housing structure and having a glue funneling entrance bevel in the outward surface of said housing.

* * * * *